United States Patent
Young et al.

(10) Patent No.: US 6,215,812 B1
(45) Date of Patent: Apr. 10, 2001

(54) INTERFERENCE CANCELLER FOR THE PROTECTION OF DIRECT-SEQUENCE SPREAD-SPECTRUM COMMUNICATIONS FROM HIGH-POWER NARROWBAND INTERFERENCE

(75) Inventors: Shane Michael Joseph Young, Nepean; David Charles Bongfeldt, Stittsville, both of (CA)

(73) Assignee: Bae Systems Canada Inc., Ville St-Laurent (CA)

( * ) Notice: Subject to any disclaimer, the term of this patent is extended or adjusted under 35 U.S.C. 154(b) by 0 days.

(21) Appl. No.: 09/461,216

(22) Filed: Dec. 16, 1999

Related U.S. Application Data

(63) Continuation of application No. PCT/CA99/00081, filed on Jan. 28, 1999.

(51) Int. Cl.[7] .............................. H04L 27/30; H04B 1/10
(52) U.S. Cl. ................................. 375/144; 455/296
(58) Field of Search ......................... 375/144, 140, 375/147, 346; 455/296, 303, 208.1, 272, 278.1

(56) References Cited

U.S. PATENT DOCUMENTS

| | | | |
|---|---|---|---|
| 3,932,818 | 1/1976 | Masak | 708/322 |
| 4,989,262 | * 1/1991 | Saito | 455/138 |
| 4,991,165 | 2/1991 | Cronyn | 370/278 |
| 5,027,123 | 6/1991 | Haykin et al. | 342/188 |
| 5,046,133 | * 9/1991 | Watanabe et al. | 455/138 |
| 5,148,117 | 9/1992 | Talwar | 330/151 |
| 5,377,225 | 12/1994 | Davis | 378/342 |
| 5,440,308 | * 8/1995 | Dybdal et al. | 342/17 |
| 5,568,158 | * 10/1996 | Gould | 343/756 |
| 5,596,600 | 1/1997 | Esser et al. | 375/206 |
| 5,598,428 | 1/1997 | Sato | 375/206 |
| 5,614,914 | 3/1997 | Bolgiano et al. | 342/634 |
| 5,629,929 | 5/1997 | Blanchard et al. | 370/201 |
| 5,630,223 | * 5/1997 | Bahu et al. | 455/296 |
| 5,642,353 | 6/1997 | Roy, III et al. | 370/329 |
| 5,687,162 | 11/1997 | Yoshida et al. | 370/203 |
| 5,691,978 | 11/1997 | Kenworthy | 370/278 |
| 5,719,852 | 2/1998 | Shilling et al. | 370/201 |
| 5,722,063 | 2/1998 | Peterzell et al. | 455/287 |
| 5,737,365 | 4/1998 | Gilbert et al. | 375/224 |
| 5,771,439 | 6/1998 | Kennedy, Jr. et al. | 455/63 |

FOREIGN PATENT DOCUMENTS

| | | |
|---|---|---|
| 42 20 296 | 12/1993 | (DE) . |
| 62-500418 | 2/1987 | (JP) . |
| 7-298336 | 11/1995 | (JP) . |
| 8-307333 | 11/1996 | (JP) . |
| 9-238098 | 9/1997 | (JP) . |

OTHER PUBLICATIONS

Yoon Y. C. et al. "A spread–Spectrum Multiaccess System with Cochannel Interference Cancellation for Multipath Fading Channels, IEEE Journal on selected areas in Communications", Sep. 1, 1993 pp. 1067–1075, XP000400016 No. &, New York, USA,pp1067–1075.

* cited by examiner

Primary Examiner—Chi Pham
Assistant Examiner—Khai Tran
(74) Attorney, Agent, or Firm—Swabey Ogilvy Renault

(57) ABSTRACT

A system for canceling contaminating narrowband interference for a wideband DSSS receiver by weighting a channelized copy of the signal of interest in accordance with the result of a correlation between a narrowband copy of the channelized signal of interest centered around the center frequency of the contaminating narrowband interference and a narrowband copy of a wideband feedback signal centered around the center frequency of the contaminating narrowband interference.

16 Claims, 8 Drawing Sheets

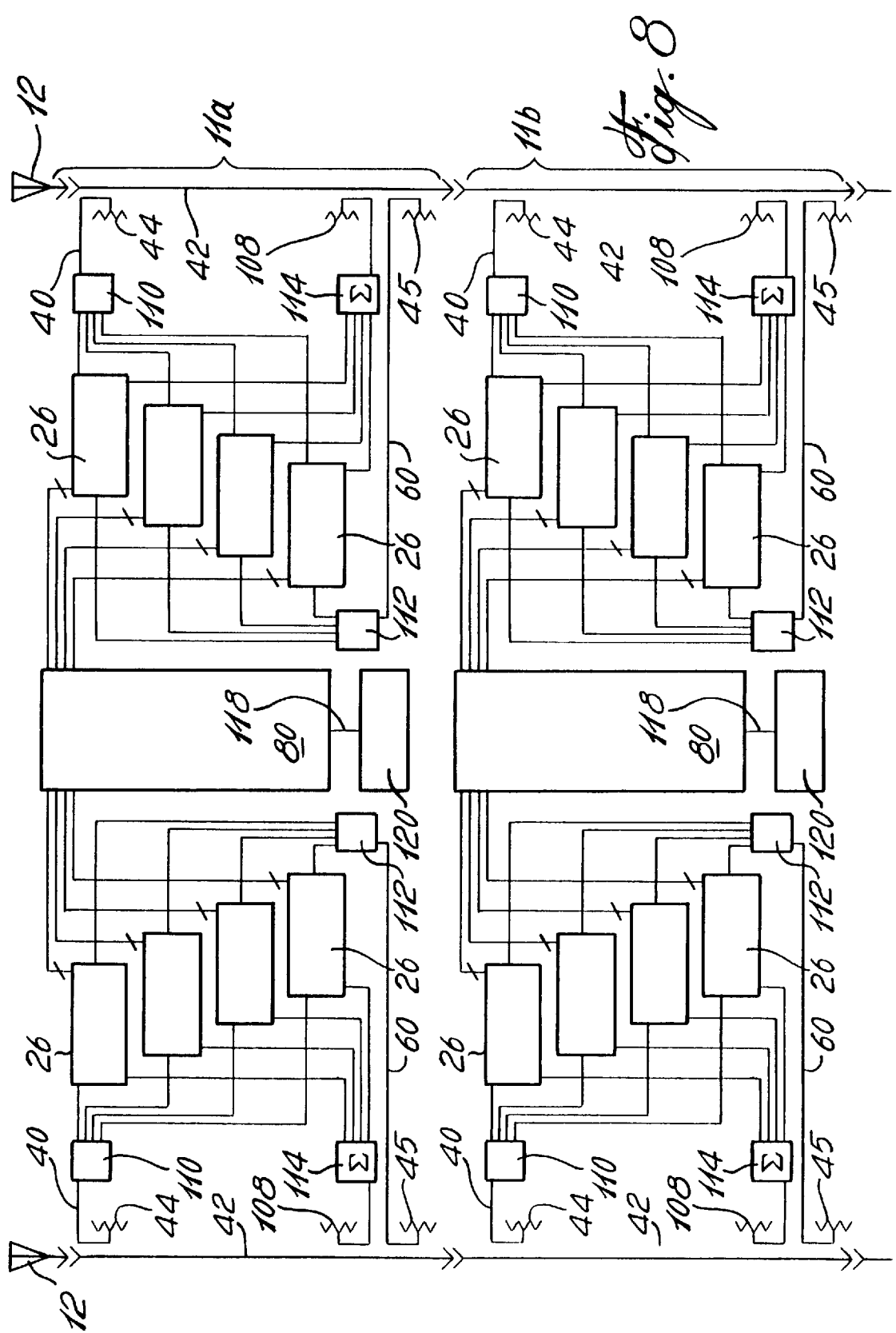

INTERFERENCE CANCELLER FOR THE PROTECTION OF DIRECT-SEQUENCE SPREAD-SPECTRUM COMMUNICATIONS FROM HIGH-POWER NARROWBAND INTERFERENCE

This application is a continuation of PCT/CA99/00081 filed Jan. 28, 1999, now pending in the International phase with a designation of the United States.

FIELD OF THE INVENTION

The present invention relates to apparatus and methods of canceling narrowband interference present in the bandwidth of a wideband direct-sequence spread-spectrum received signal. High-power interference is understood to mean an interfering signal whose total power, as measured over the signal bandwidth of the narrowband interference, is greater than the total power of the wideband DSSS, as measured over the signal bandwidth of the narrowband interference. Wideband is understood to mean a frequency domain bandwidth, which is much greater than the minimum bandwidth required to transmit the information.

BACKGROUND OF THE INVENTION

The need for a communication service which is convenient, affordable, and reliable has been fueled by market demand. The convenience requirement is covered by providing the customer with portable wireless communication devices. To date, wireless portable communications devices have primarily consisted of wireless portable telephones (cellular) for wireless voice communications. Recent market trends are gravitating towards providing integrated wireless voice and data communications (fax, e-mail, etc.) and making it available "on the move/on demand." Affordability is achieved through the economies of scale from the ever increasing number of users of these technologies and the resulting decrease in the manufacturing costs of integrated electronics. Lastly, the issue of reliability of wireless communications is the topic of the present invention; more specifically, the ability of wireless communications receiver systems to better reject interfering noise in wireless communications.

In referring to noise in what follows, one understands its definition in the context of electrical noise with respect to an electrical system under consideration. Electrical noise thus defined can take a variety of forms, including: radio frequency (RF) noise, thermally induced electrical noise and signal distortions introduced by electrical components in performing their intended function. Thermally induced electrical noise and signal distortion introduced by electrical components can be characterized and establishes a lower threshold for the transmission and detection of radio frequency signals.

RF noise comprises RF signals transmitted by electrical equipment as a side effect of their intended function, RF signals of a natural source which create a background level, and RF signals transmitted by other electrical equipment as a direct effect of its intended function but which interferes with the operation of a system under consideration. The first form of RF noise can be handled by careful equipment design and proper shielding and is usually mandated through government regulation. The second form of RF noise can be characterized and further degrades the lower threshold for transmission and detection of RP signals of interest. The last form of RF noise should not normally constitute a problem due to careful government control and allocation of the scarce radio spectrum. This last form of RF noise encompasses signal jamming, whether it is intentional or otherwise. It is this last type of RF noise that is characterized as RF interference. The present invention attempts to isolate RF interference and to alleviate its effects.

In wireless communications there are many levels at which noise can disturb a wireless link and therefore introduce signal degradation. RF transmissions for example, are subject to signal distortion due to the severe nature of the propagation medium. There are many types of signal distortions and generally they are characterized in order to design wireless communications systems that are immune to their effects. One such signal distortion is a type of self-interference that arises from the reception of multiple reflections of the same signal. These multiple reflections cause attenuation of the received signal and in a digital system induce a delay spread that tends to smear the bits comprising the digitized voice. This is known as multipath fading. Although multipath fading is a frequency dependant phenomenon that places severe constraints on the ability to provide a reliable wireless link, it can nevertheless be characterized and its affects minimized through conservative design (i.e., providing adequate fade margin) and by employing such techniques as spatial diversity.

One of the most recent techniques to be employed in commercial wireless applications, one which is inherently resilient to multipath fading, employs a modulation technique which encodes the digital sequence of bits to be transmitted in such a way that the resulting signal spectrum is spread over a much wider range of frequencies than is necessary to transmit the information. This technique is referred to as direct-sequence spread-spectrum or DSSS.

The Code Division Multiple Access (CDMA) digital cellular standard, which is based upon DSSS techniques, is arguably one of the most robust and potentially highest capacity systems yet deployed. However, even with its theoretical ability to suppress interference due to its "processing gain" (a function of the ratio of the RF bandwidth of the DSSS signal to the information signal bandwidth) it is nevertheless still susceptible to and is fundamentally an interference limited system.

RF interference which is characterized as being high-power (i.e., strong amplitude) and narrow bandwidth, is a form of intra-system interference in that it is produced by other concurrent users, either legal or illegal, who are transmitting in the same spectrum allocated for the CDMA service. This can lead to severe degradation of the DSSS-based CDMA system in terms of capacity (i.e., number of users), voice quality, etc. In some cases it can result in the complete loss of wireless communications. Under such conditions, this narrowband interference or NBI is said to overwhelm the DSSS receiver.

The present invention is concerned with a system for the detection, isolation and cancellation of NBI that falls within the bandwidth of a DSSS signal for the purpose of restoring the DSSS receiver to an acceptable operational state and thereby render it immune to NBI.

DESCRIPTION OF THE PRIOR ART

It is known to provide NBI cancellation. U.S. Pat. No. 4,991,165 Cronyn, issued Feb. 5, 1991, describes an interference canceller that requires a copy of the interfering RF signal from a nearby transmitter on a separate input port and then uses that signal to perform the cancellation. U.S. Pat. No. 5,629,929 Blanchard issued May 13, 1997, describes a receiver design employing Fast Fourier Transform (FFT)

techniques for characterizing the input power spectrum which allows the receiver to isolate NBI and cancel it. U.S. Pat. No. 5,596,600 Dimos, issued Jan. 21, 1997, suppresses NBI by digitally filtering the received signal prior to despreading by employing an adaptive transversal filter (ATF) whereby the spread spectrum signal is converted from RF to baseband for digital processing by the ATF followed by conversion back to RF before being fed into the receiver.

The above mentioned inventions generally take the form of either a completely new receiver implementation or an in-line signal pre-processor. In the case of a new receiver implementation, this would require already deployed receivers to be replaced and/or modified which would represent a costly solution. The in-line signal pre-processor, which by definition is installed in the received signal path, has a twofold drawback in that a malfunction would result in complete system failure in addition to the fact that in-line signal processing, which is usually performed at baseband, can cause serious degradation to the desired received signal due to amplitude and/or phase distortion that necessarily results from the signal processing performed to cancel the NBI. Yet another drawback of the above mentioned inventions is the fact that their implementation relies heavily on specific information contained in the received signal. Loss of ability to extract such information leads to failure.

SUMMARY OF THE INVENTION

A superior NBI canceller, as envisioned in the present invention, would take the form of add-on hardware which is compatible with present and future wireless communications systems employing DSSS techniques. This would, among other things, provide for a comparatively less costly solution for combating NBI as it could be deployed on an "as required basis" and without the need to replace and/or modify the existing receiver equipment. A superior NBI canceller, as envisioned in the present invention, would not require any auxiliary inputs such as a separate sample of the interference. A superior NBI canceller, as envisioned in the present invention, would process the incoming signal so as to remove NBI at RF before it enters the receiver and do so without performing any in-line signal processing functions such as down- or up-conversion, analog-to-digital conversion, etc. and thereby minimize any potential distortion of the received wideband DSSS signal. In addition, the present invention would allow the receiver, which is downstream from the interference canceller, to remain operational in the event of failure of the NBI canceller, albeit without the benefit of interference cancellation. A superior NBI canceller would have the ability to detect the presence of, isolate, characterize and suppress one or more sources of NBI in an incoming wideband DSSS signal without having to make use of any signal dependent characteristics such as the modulation structure of the DSSS signal for example.

It is an aim of the present invention to provide cancellation of high-power NBI in a wideband DSSS signal.

It is another aim of the present invention to provide cancellation of NBI for a wideband DSSS receiver employing spatial diversity techniques, wherein the interference cancellation is done in parallel for each diversity antenna/receiver.

It is another aim of the present invention to provide cancellation of NBI for a wideband DSSS receiver without the requirement for any external auxiliary inputs such as a sample of the NBI.

It is another aim of the present invention to provide cancellation of NBI for a wideband DSSS receiver by using add-on equipment and without having to replace and/or modify the signal processing system of the existing receiver and without performing any in-line signal processing functions such as up- and/or down-conversion, analog-to-digital conversion, etc. in the received signal path.

It is another aim of the present invention to provide cancellation of NBI for a wideband DSSS receiver without requiring a priori knowledge of the modulation methods employed by either the wideband DSSS signal or the narrowband interfering signal(s).

It is another aim of the present invention to provide cancellation of NBI for a wideband DSSS receiver without requiring a priori knowledge of the direction of arrival of the interfering signal(s).

It is another aim of the present invention to provide adaptive cancellation of variable NBI for a wideband DSSS receiver, in which the amplitude and/or center frequency of the NBI is neither a priori known nor time invariant.

It is another aim of the present invention to provide cancellation of NBI for a wideband DSSS receiver wherein the cancellation bandwidth is limited to the bandwidth of the NBI so as to minimize the effects on the wideband DSSS receive signal.

It is another aim of the present invention to provide constant cancellation performance of the NBI over the input power dynamic range of the NBI signal(s). It is another aim of the present invention to provide adaptive cancellation of the varying NBI for a wideband DSSS receiver whereby optimum cancellation performance is adaptively maintained through the action of closed-loop feedback techniques.

It is another aim of the present invention to provide cancellation of the frequency variable NBI for a wideband DSSS receiver whereby the presence of valid NBI is automatically determined by employing a "decision-aided" system that uses a software based search algorithm in an embedded controller.

It is another aim of the present invention to provide cancellation of NBI for a wideband DSSS receiver whereby the NBI is first isolated, then characterized as a valid interferer in terms of amplitude and then cancelled.

It is another aim of the present invention to provide cancellation of NBI for a wideband DSSS receiver whereby the cancellation performance is independent of the fading environment.

It is another aim of the present invention to provide cancellation of NBI for a DSSS wideband receiver whereby each narrowband interferer is channelized and wherein channelization is understood to mean frequency isolation of the NBI and frequency-selective correlation over the NBI signal bandwidth so as to limit the cancellation of NBI to the signal bandwidth of the NBI.

It is another aim of the present invention to provide cancellation of NBI for a wideband DSSS receiver whereby a frequency-isolated and selectively correlated copy of the NBI signal is complex weighted (i.e. the amplitude and phase is adjusted) and used as a counterinterference for vector cancellation under closed-loop control.

It is another aim of the present invention to provide cancellation of NBI for a wideband DSSS receiver whereby the signal processing function of complex weighting and the action of vector cancellation of the NBI is performed at RF thereby minimizing the deleterious effects of NBI at the earliest possible stage.

It is another aim of the present invention to provide a design of an interference canceling system that is scalable in terms of the number of simultaneous NBIs to be processed and the degree of cancellation required.

It is another aim of the present invention to provide a design of an interference canceling system that is fault tolerant in that the failure of any interference processor does not result in complete failure of the canceller but rather a graceful degradation in terms of a reduction in the number of simultaneous NBI's that can be cancelled.

It is another aim of the present invention to provide a method of interference canceling that is fault tolerant in that the failure of the interference canceling system itself does not completely hinder the operation of the receiver but rather leaves the receiver in an operational state corresponding to the case in which the interference canceller was not present at all.

It is another aim of the present invention to provide an interference canceling system comprising a plurality of cascaded interference cancellers which provide for scalability and fault tolerance.

According to a first broad aspect of the invention, there is provided an interference cancellation system that mitigates deleterious effects of one or more narrowband interference (NBI) signals against a wideband signal of interest in a received signal in a received signal path. The system comprises auxiliary sample means for extracting a copy of the received signal to obtain a wideband auxiliary signal; feedback sample means for extracting from the received signal path a wideband error feedback signal downstream from the auxiliary sample means, and for processing the error feedback signal to isolate a narrowband feedback signal in response to a variable frequency control signal determining a central frequency of the narrowband feedback signal; means for generating a narrowband reference signal from the auxiliary signal in response to a variable frequency control signal determining a central frequency of the narrowband reference signal, the narrowband reference signal containing one of the one or more NBI signals and having a strong correlation with respect to the narrowband feedback signal as a result of the NBI and not as a result of the signal of interest; controller means for sweeping through at least a portion of a frequency range of the wideband signal of interest by setting the variable frequency control signal, for determining whether the wideband signal of interest is contaminated by NBI by examining the narrowband reference signal, and for generating in response to detection of NBI an NBI cancellation control signal; means for correlating the narrowband reference signal and the narrowband feedback signal and for generating a complex correlation signal; means providing an injection signal containing the one of the NBI signals; complex weighting means for adjusting an amplitude and a phase of the injection signal in response to the correlation signal, and for generating, subject to the NBI cancellation control signal, an NBI cancellation signal; and means for injecting the NBI cancellation signal into the received signal path downstream of the auxiliary sample means and upstream of the feedback sample means. In this way, the contaminating NBI is cancelled from the wideband signal of interest in the received signal path. To avoid correlation and canceling of the signal-of-interest, the reference signal can be delayed with respect to the feedback signal, and/or the signal strength of the signal-of-interest in the one or both of the reference and feedback signals can be attenuated. Preferably, the means for generating a narrowband reference signal comprise a channelization network suppressing signal strength and introducing a delay at frequencies away from the central frequency. The channelization network may comprise a first filter receiving the auxiliary signal passing a bandwidth of the NBI, a second filter receiving the auxiliary signal passing a bandwidth wider than the NBI, and summing means for summing an output of the first and second filters.

According to a second broad aspect of the invention, there is provided a method of canceling NBI in a wideband signal. The method comprises: extracting a reference signal and a feedback signal in a receiver signal path; scanning the reference signal for contaminating NBI to determine the central frequency of the contaminating NBI; isolating narrowband copies about the central frequency from the reference signal and the feedback signal, wherein the narrowband copy of the reference signal is strongly correlated with the narrowband copy of the feedback signal as a result of the NBI and not as a result of a signal of interest; correlating the narrowband copies; complex weighting an injection copy of the wideband reference signal using a result of the correlation; and injecting the weighted injection copy into the receiver signal path at a point between a point of extraction of the reference signal and of the feedback signal. In this way, an equivalent of a notch filter is applied to the wideband signal of interest at the frequency of the contaminating NBI.

The invention also provides a method of canceling contaminating NBI in a wideband signal in a receiver signal path, the method comprising: providing at least two cancellation devices of the type which extract a copy of the wideband signal from the receiver signal path and inject a cancellation signal into the receiver signal path prior to entering a receiver; and coupling the cancellation devices in a cascade arrangement to a receiver antenna. In this way, fault tolerance and scalability is achieved. Preferably, the method further comprises steps of: detecting NBI within the wideband signal prior to cancellation by the cancellation devices; and indicating to the cancellation devices at which frequency NBI to be cancelled is found. Also, preferably, the method further comprises steps of: detecting a quality of NBI cancellation in the receiver signal path after the cancellation devices; and adjusting, if necessary, the indicating to optimize NBI cancellation.

BRIEF DESCRIPTION OF THE DRAWINGS

The present invention will be better understood by way of the following detailed description of embodiments as shown in the appended diagrams in which:

FIG. 8 is a connection diagram illustrating according to the present invention the scalability and fault tolerant set-up of two interference cancellers with interference processors connected in parallel.

DETAILED DESCRIPTION OF THE INVENTION

Figure 1:
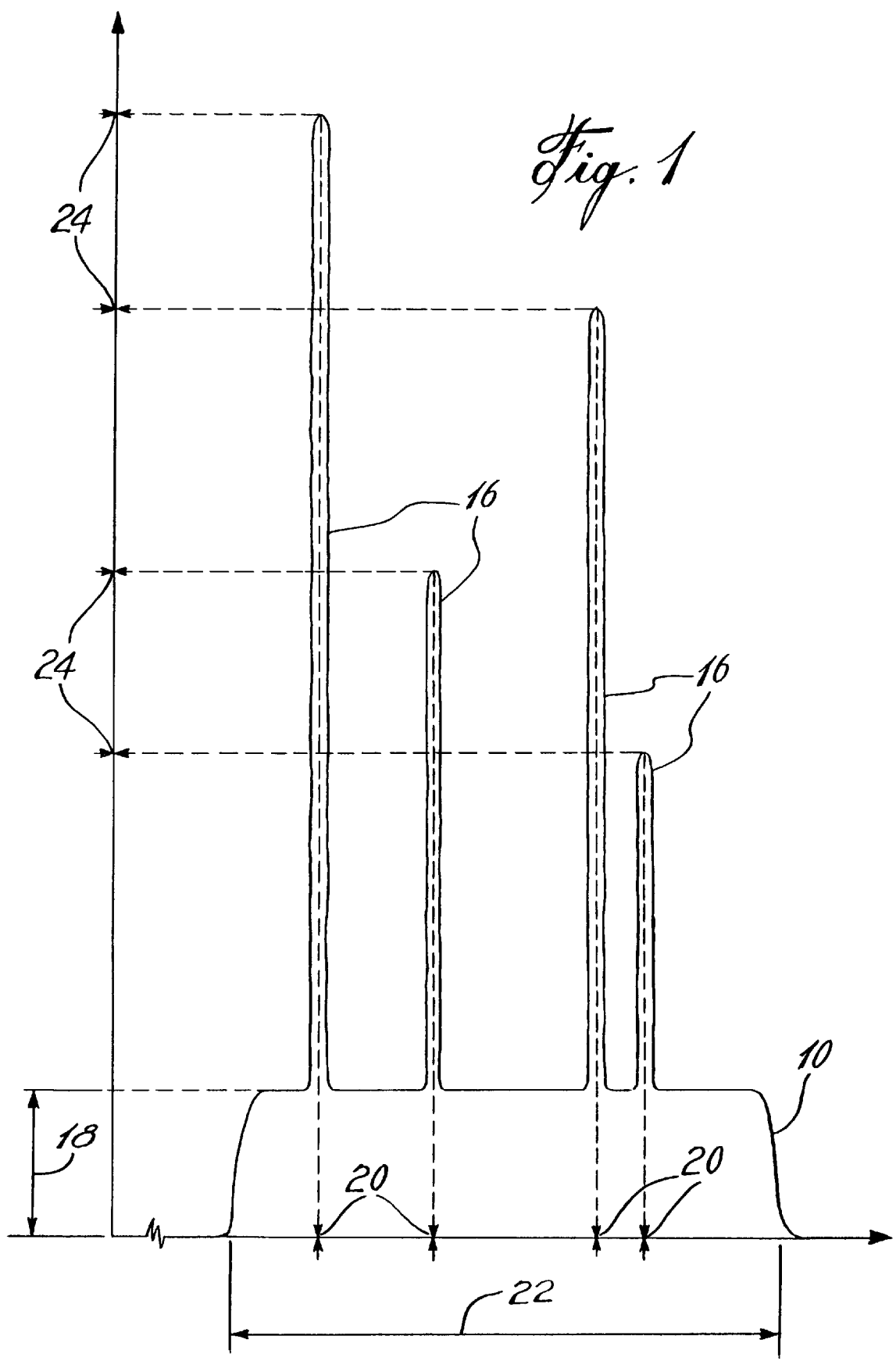
FIG. 1 schematically illustrates a wideband DSSS signal with NBI superimposed.
Figure 3:
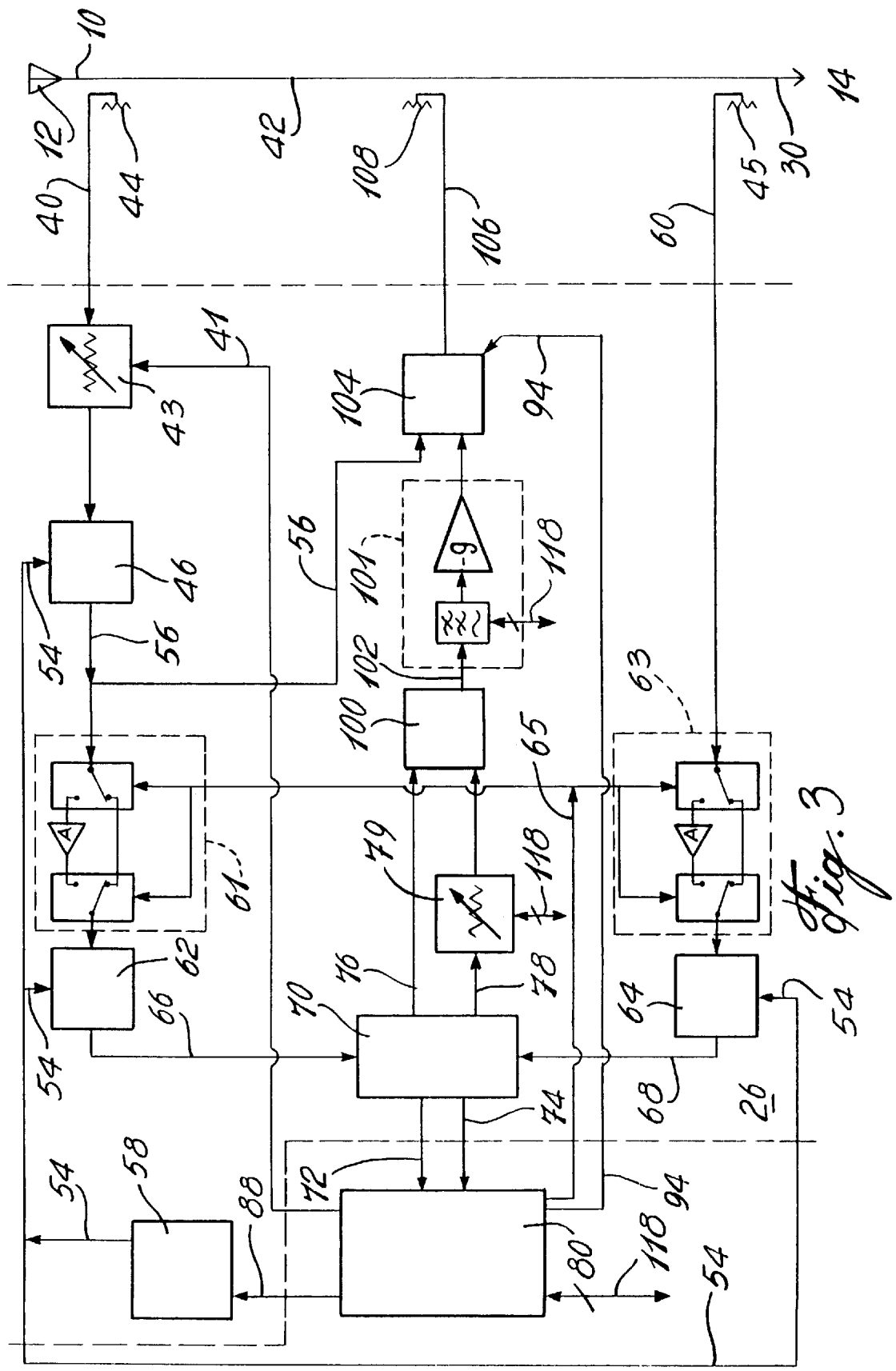
FIG. 3 schematically illustrates an embodiment of the present invention as it relates to an interference canceller comprising one interference processor in its preferred embodiment.

An NBI-contaminated wideband DSSS signal 10, is received at an antenna 12 of a DSSS receiver 14 (shown in FIG. 3). The structure of the NBI-contaminated wideband DSSS signal 10 is characterized by the presence of narrowband interference 16 with peaks extending above the DSSS signal strength level 18 and, as shown in FIG. 1, having an NBI signal strength that may vary from only slightly stronger than the DSSS signal strength to many orders of magnitude stronger. In addition, the NBI peaks 16 may be present at any frequency 20 or frequencies 20 within the bandwidth 22 of the DSSS signal 10 corresponding to the frequency channel(s) of the NBI. The presence of contaminating NBI 16 of sufficient strength, number and duration in the DSSS signal bandwidth 10, leads to a degradation in the operation of a DSSS receiver in terms of its ability to receive and process a DSSS signal and subsequently recover/demodulate the information. If the signal strength of the NBI is sufficiently strong, a complete loss of the communication function would result. In such cases wherein the inherent processing gain of a DSSS receiver is insufficient to overcome a NBI whose peak amplitude is a few orders of magnitude greater than that of the DSSS signal, the DSSS receiver is said to be overwhelmed.

Figure 2:
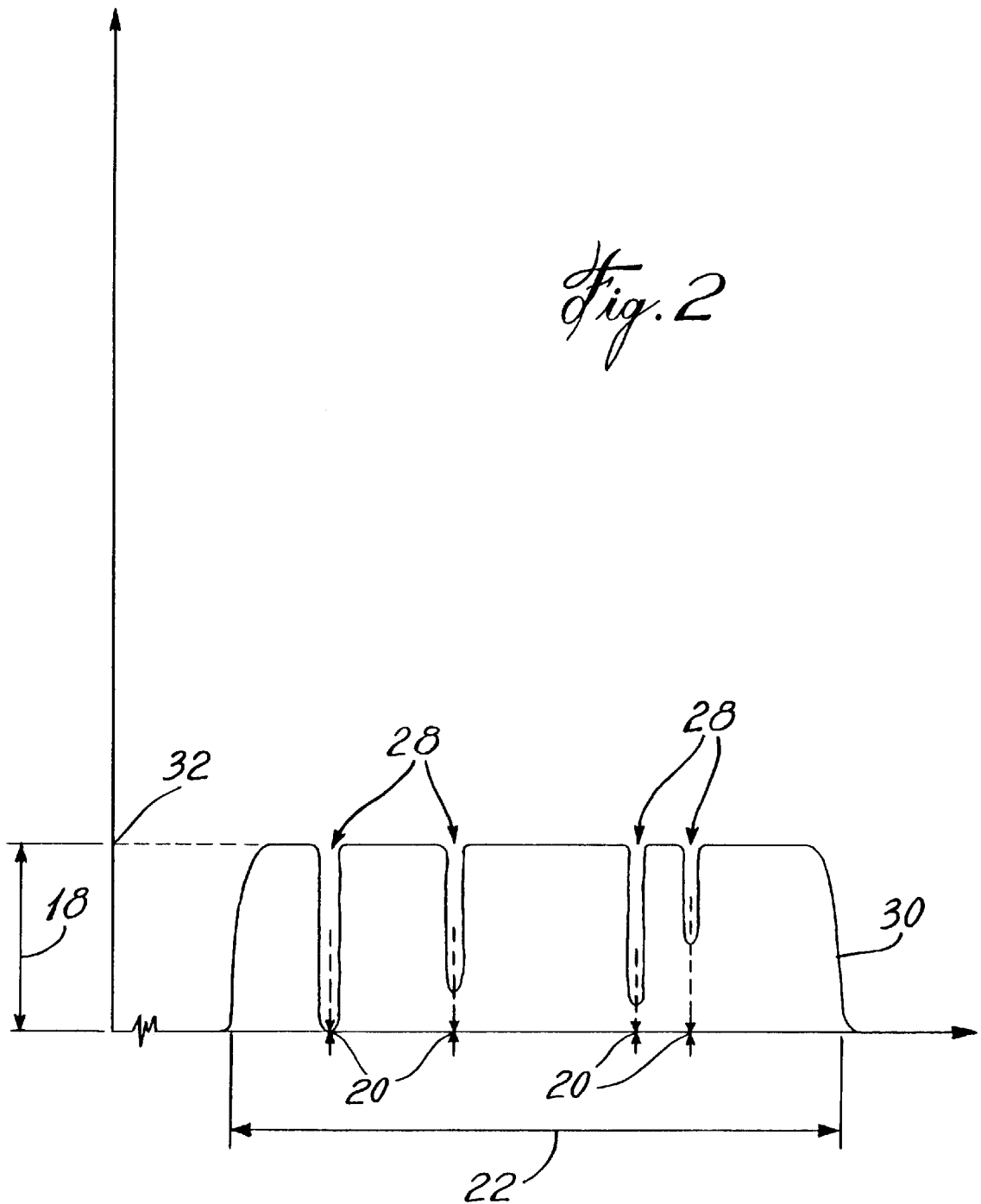
FIG. 2 schematically illustrates the same wideband DSSS signal with the NBI suppressed by an interference canceller according to an embodiment of the present invention.

FIG. 2 shows the frequency domain notch effect 28 due to interference cancellation by interference processors 26, described according to the present invention, and its effect on the DSSS received signal. As shown, the output frequency spectrum of the DSSS signal 30, as processed by a narrowband interference canceller, contains narrowband notches at frequencies corresponding to the center frequencies 20 of the contaminating NBI 16. The effect of notching out the NBI is to restore the DSSS receiver's 14 ability to perform its intended function, even in the presence of high-power narrowband interference.

FIG. 3 shows a schematic diagram of an interference canceller 11 according to an embodiment of the present invention comprising an interference processor 26. The preferred embodiment of a interference processor 26 is shown in FIG. 3. The interference processor 26 searches for, isolates, characterizes (in terms of being a valid NBI) and finally cancels one narrowband interferer 16.

According to the preferred embodiment of the interference processor 26 as related to the present invention, a copy 40 of the received NBI-contaminated wideband DSSS received signal 10 is extracted from the received signal path 42 using a directional coupler 44 and represents an auxiliary input (AUX) to the interference processor 26.

The extracted copy 40 of the received wideband signal 10 is preprocessed by a programmable input attenuator 43 according to a input attenuator control signal 41. The input attenuator 43 changes the signal strength of the AUX input signal 40 so that it matches the dynamic range of a channelization network 46 to which it is fed.

The AUX copy of the DSSS signal 40 is processed by the channelization network 46 that provides frequency isolation of the NBI and enables frequency-selective correlation over the NBI signal bandwidth.

Figure 4:
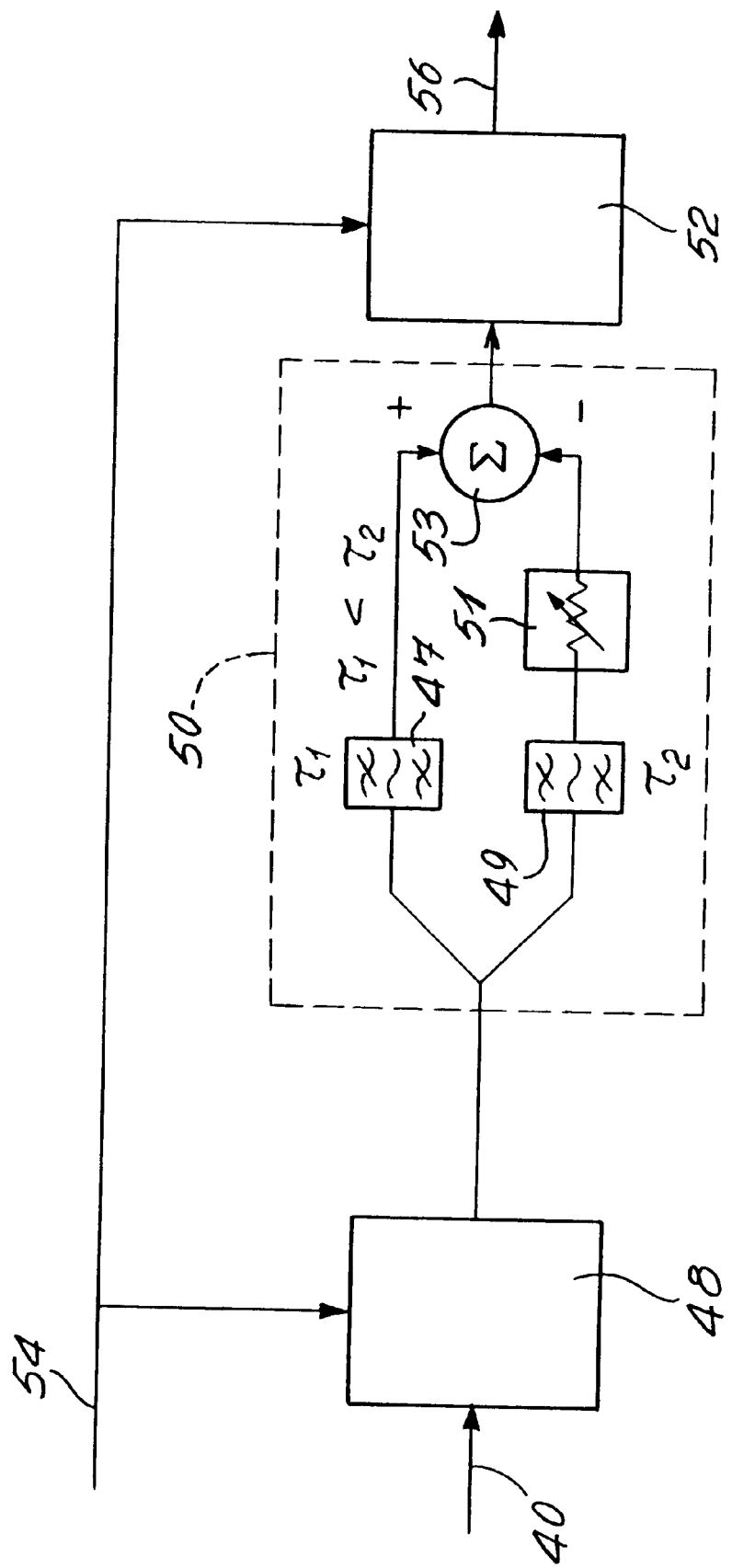
FIG. 4 is a functional diagram of a channelization and frequency selective correlation network according to the present invention.

FIG. 4 shows the AUX input being down-converted 48, channelized 50, and then upconverted 52. The down-converter 48 and upconverter 52 perform their function in accordance with a local oscillator frequency input 54 and effectively render the channelization function independent of input frequency.

The channelization is performed by band-pass filters 47 and 49. The band-pass filter 47 takes a bandwidth slice around the NBI covering more than the bandwidth of the NBI and the band-pass filter 49 takes a bandwidth slice around the NBI center frequency covering the bandwidth of the NBI. The two slice widths are a few orders of magnitude apart. A side effect of filtering is that the two signals are delayed in time. The magnitude of the delay of the NBI bandwidth is larger. A signal attenuator 51 is used for its side effect of decreasing the magnitude of the time delay incurred by the NBI bandwidth and is adjusted, at set-up, so that the two delays match in magnitude. A signal combiner 51 takes the two signals and in performing its function outputs a signal of the same bandwidth at allowed by band-pass filter 47 with the NBI bandwidth undelayed but the rest of it delayed.

The signal as processed by the channelization network 46 is a reference (REF) signal 56 for the interference processor 26.

Referring to FIG. 3, another copy 60 of the wideband DSSS signal is extracted by the directional coupler 45 from the received signal path 42 downstream of where the AUX copy 40 is extracted. This second copy becomes the feedback (FBK) signal input 60 to the interference processor 26 as required in a feedback closed-loop system.

The REF signal 56 and FBK signal 60 are independently passed through LNA stages 61 and 63, respectively. The LNA stages are activated by LNA control signal 65 as more sensitivity is required to process the NBI 16.

The interference processor 26 sweeps through the DSSS signal bandwidth 22 according to a software based search algorithm in the controller to detect the presence of NBI 16, by programming a frequency generator 58 to provide the local oscillator output signal 54 corresponding to the NBI frequency channels spanning the DSSS signal bandwidth.

The REF signal 56 and the FBK signal 60 are filtered separately by narrowband signal extractors 62 and 64. The reference narrowband signal extractor 62 takes as another input the current scanning frequency of the local oscillator 54 and outputs a narrowband intermediate frequency (IF) reference signal 66 centered around the current scanning NBI channel frequency. The feedback narrowband signal extractor 64 takes as another input the current scanning frequency of the local oscillator 54 and outputs a narrowband IF feedback signal 68 centered around the current scanning NBI channel frequency.

The narrowband IF REF signal 66 and the narrowband IF FBK signal 68 are then fed into an automatic gain controller (AGC) stage 70. The AGC stage 70 is configured as a master/slave AGC for the narrowband IF REF signal 66 and the narrowband IF FBK signal 68 respectively. This master/slave AGC stage 70 provides a constant amplitude/phase reference input to the reference input side of the correlator 100 as well as ensuring constant cancellation performance over the NBI input signal dynamic due to "slaving" of the FBK AGC to the master or REF AGC.

The outputs of the automatic gain control 70 consists of two pairs of signals. The first pair, referred to as REF_LVL signal 72 and FBK_LVL signal 74, respectively, provide information to a controller 80 regarding the signal power level of the NBI. The second pair of output signals of the AGC stage 70 is the normalized narrowband IF reference signal (REF_AGC) 76 and the normalized narrowband IF feedback signal (FBK_AGC) 78.

Figure 5:
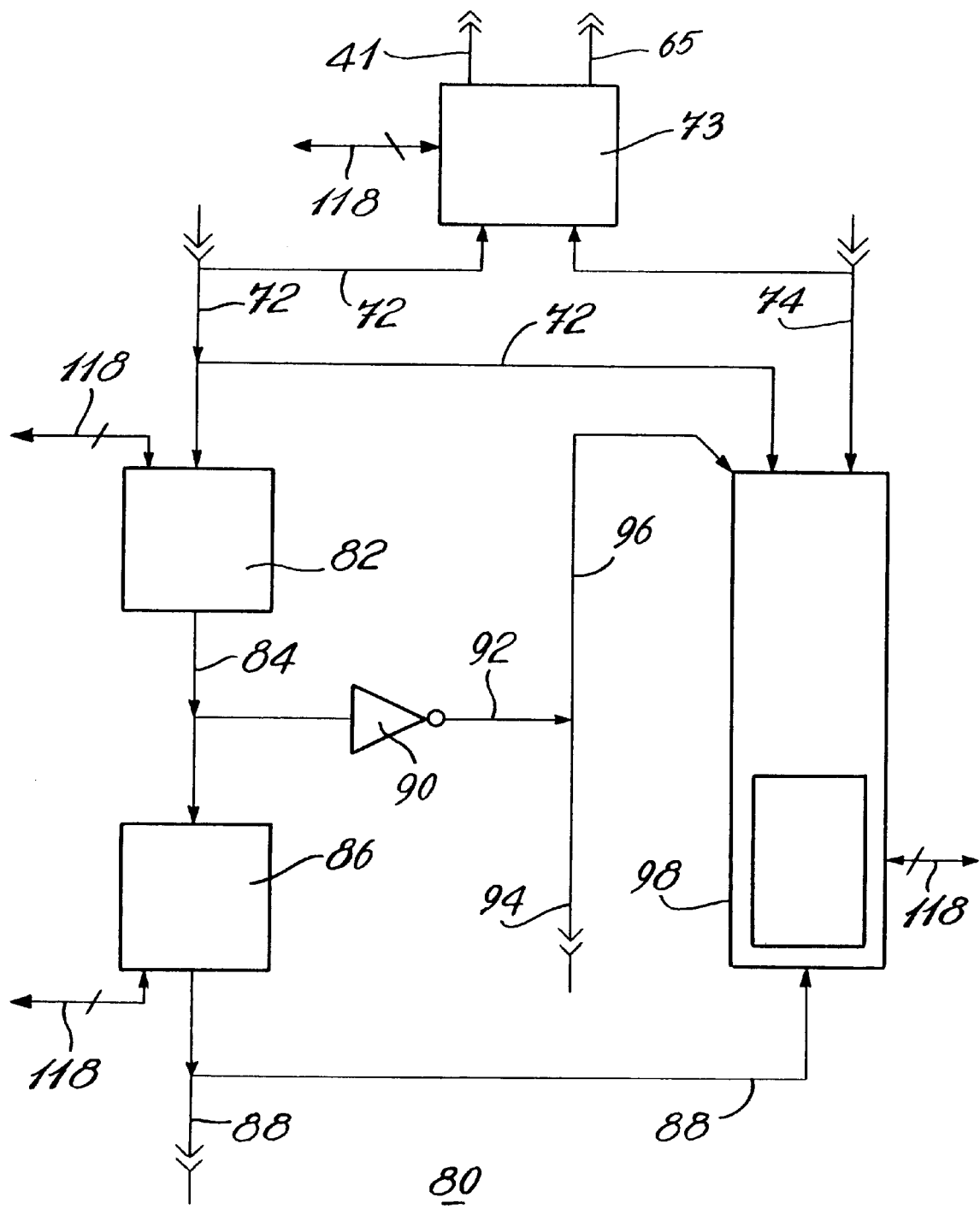
FIG. 5 is a functional diagram of an embodiment of ??? a decision-aided canceller using an embedded controller running a software based search algorithm according to the present invention.

The control signals REF_LVL 72 and FBK_LVL 74 are fed into the controller 80 whose functional diagram is shown in FIG. 5.

Copies of the control signals 72 and 74 are fed into a sensitivity and input signal attenuation subcontroller 73. Under dynamic software control, subcontroller 73 optimizes the input dynamic range of the AUX input 40 through input attenuator control signal 41 depending upon the nature of the interfering environment (i.e. predominantly strong or predominantly weak interferers). Strong signals which might overload the front end are attenuated and weak signals that require maximum sensitivity are not attenuated. Under dynamic software control, subcontroller 73 further optimizes input dynamic range of the REF input 56 and the FBK input 60 through the LNA control signal 65 depending upon the nature of the interfering environment (i.e. predominantly strong or predominantly weak interferers). Weak signals that require maximum sensitivity are amplified and strong signals are not.

A copy of the REF_LVL signal 72 is fed into a narrowband interference discriminator 82. The NBI discriminator 82 when not detecting the presence of NBI outputs a logic high signal 84 which effectively puts the interference processor 26 in sweep mode. The sweep mode signal 84 activates a software search algorithm 86 which determines the next frequency to be scanned for the presence of NBI. The next frequency to be scanned is output as a local oscillator program signal (LO_PROG) 88.

In the case in which the NBI discriminator detects the presence of NBI in the REF_LVL signal 82, the sweep mode signal 84 is logic low. A copy of the sweep mode signal is inverted by inverter 90 into an interference canceller mode enable signal 92. A copy of the interference canceller mode enable signal 92 termed as complex weighter enable signal (WT_EN) 94 is output from the controller 80 and controls the NBI canceling function by enabling or disabling the complex weighter 104. A data acquisition module 98 tabulates the REF_LVL 72, FBK_LVL 74 and LO_PROG 88 signals.

Returning to FIG. 3, the REF_AGC 76 and FBK_AGC 78 signals are fed into a correlator 100 which outputs a complex signal 102 and which after suitable filtering and amplification by a stage 101, is used to control the complex weighter 104. The complex weighter 104 is enabled by the controller 80 when a valid NBI is detected, in terms of signal strength, and takes as input the phase and amplitude of the baseband correlation control signal 102 and a copy of the channelized reference signal 56. The complex weighter 104 then outputs an NBI cancellation signal 106 or counterinterference which is summed into the received signal path 42 using a directional signal coupler 108 placed between couplers 44, 45.

A feedback programmable attenuator 79 in the signal path of the FBK_AGC signal 78 is used in combination with the stage 101 to determine the overall cancellation loop gain and response-time time-constant of the feedback loop. The combination of the feedback programmable attenuator 79 and stage 101 is used to provide maximum flexibility for all types of installations and interference environments, and is largely adjusted at system set-up.

Figure 6:
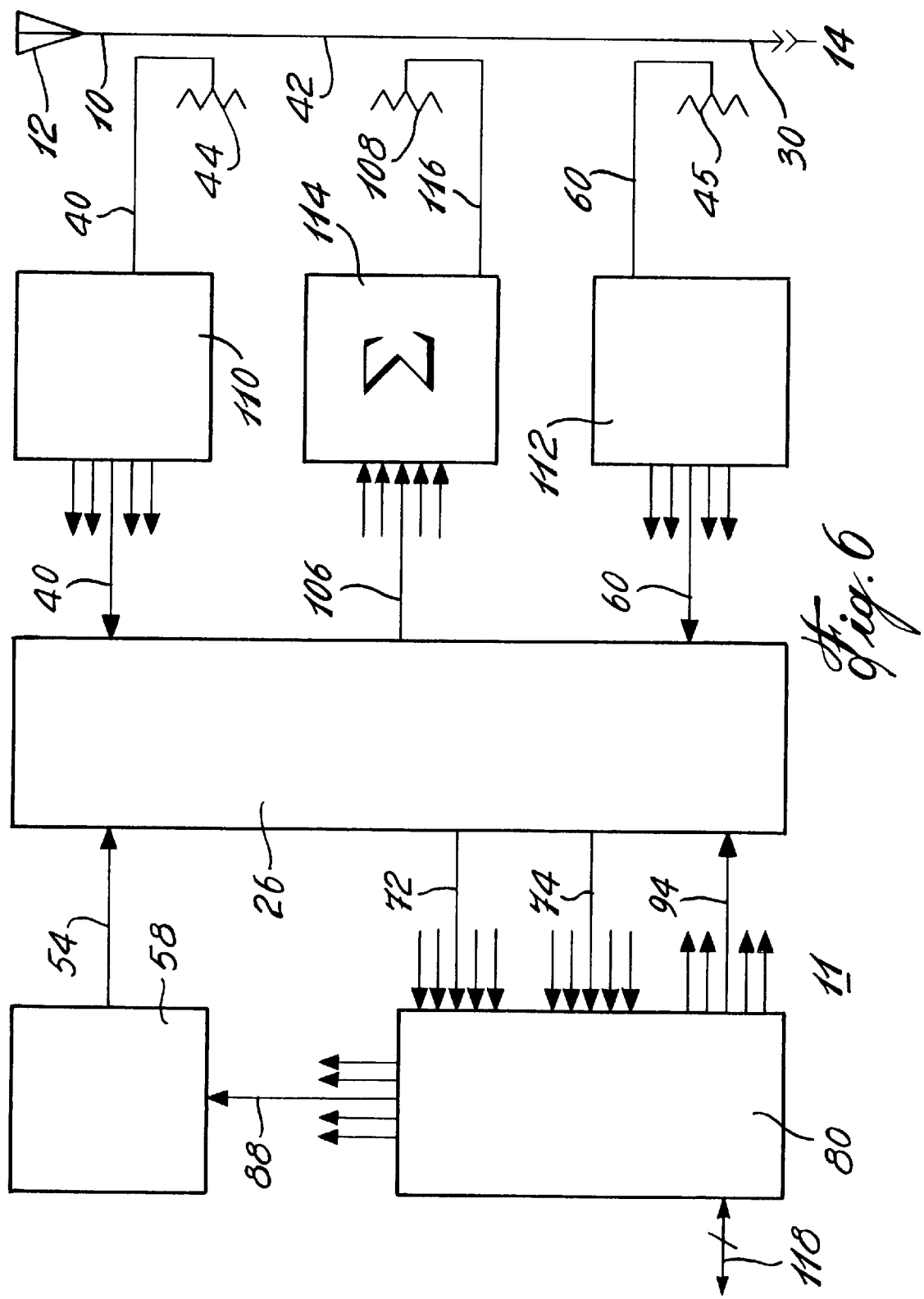
FIG. 6 is a functional diagram of an embodiment of the present invention as it relates to an interference canceller having a plurality of interference processors connected in parallel.

According to another embodiment of the present invention, an interference canceller 11 shown in FIG. 6, is able to provide simultaneous interference cancellation of a plurality of narrowband interferers by employing a plurality of interference processors 26. For this purpose the AUX copy 40 of the DSSS signal coming from the directional coupler 44 is split up in a plurality of signals by an N-way divider 110 with each of the splits going to an interference processor 26. The FBK copy 60 of the DSSS signal coming from the directional coupler 45 is split up into a plurality of signals by an N-way divider 112 with each of the splits going to an interference processor 26. Similarly, the NBI cancellation signals 106 from each of the interference processors 26 are passed through an N-way combiner 114 to provide a combined NBI cancellation signal 116 to be coupled in the receive signal path through directional coupler 108. Similarly on the controller 80 side, all its inputs and outputs are multiple.

Although the NBI canceller is based upon an innovative analog implementation of an LMS-based correlation type interference canceller, significant improvements in the canceller's overall performance have been achieved through the use of an embedded controller running a software based algorithm. The use of such a software algorithm transforms the relatively limited capabilities of a hardware only implementation to the much more flexible and powerful "decision-aided" system. Apart from the obvious benefits of increased flexibility and ease of use, the ability to automatically search for interferers, determine if they are valid or not, based upon some predefined criteria such as being within a certain power level window, imparts intelligence to what would otherwise be a dumb canceller. In addition, combining an innovative hardware design with the software based capabilities such as only attacking the strongest interferers, overcomes certain hardware limitations such as what to do when the number of interferers exceeds the number of available interference processors in the interference canceller. In effect maximizing the use of limited hardware resources. As well, the "intelligence" imparted by the embedded controller/software algorithm enables the interference canceller to monitor and optimize its own performance by, for example, deciding that a particular interference processor assigned to cancel some interference signal is not doing an adequate job and reassigning it to some other source of interference. In essence, the canceller can be viewed as a layered algorithm consisting of a low-level hardware algorithm embedded in a high-level software algorithm.

Figure 7:
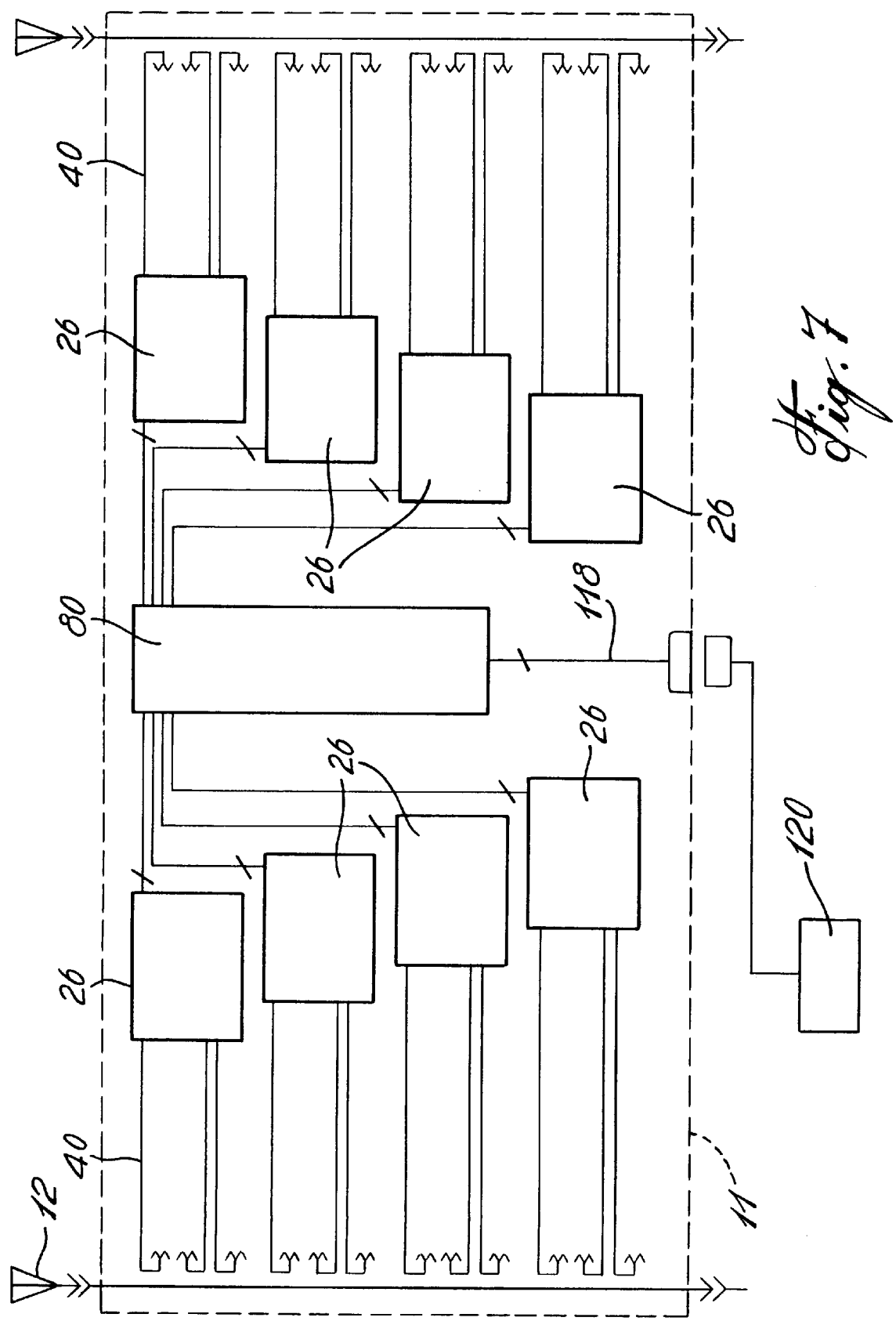
FIG. 7 is a functional diagram of a preferred embodiment of an interference canceller according to the present invention in which a plurality of cascaded interference processors canceling NBI are substantially equally divided between the two antennae of a diversity receiver.

According to the present invention, a preferred embodiment of an interference canceller, shown in FIG. 7, is able to cancel a plurality of contaminating NBIs 16 for a diversity receiver. Under control of a software based search algorithm 86 in the controller 80; the search algorithm 86 uses all interference processors 26 to scan for NBI. On finding NBI 16 present in at least one of the signals from the two antennas 12, a pair of interference processors 26, one for each side in the diversity configuration, is assigned to cancel the NBI 16. According to this preferred embodiment of the present invention, an interference canceller 11 shown in FIG. 7, is able to provide simultaneous interference cancellation of a plurality of narrowband interferers 16 by employing a plurality of interference processors 26. For this purpose the AUX copy 40 of the DSSS signal for each of the plurality of interference processors comes from a dedicated directional coupler 44 for each interference processor 26. Likewise the FBK copy 60 of the DSSS signal for each of the plurality of interference processors comes from a dedicated directional coupler 45 for each interference processor 26. Similarly, the NBI cancellation or counterinterference signals 106 from each of the of interference processors 26 are summed individually into the received signal path through dedicated directional couplers 108. Similarly on the controller 80 side, all its inputs and outputs are multiple.

This configuration of the interference processors in the interference canceller is referred to as a cascade configuration. An added benefit of the cascade configuration is that there is an inherent capability to provide even greater cancellation than a single interference processor could provide by allocating two interference processors to the same NBI and hence thereby achieving twice the cancellation. This would be useful in cases where such a strong source of NBI was present that assigning two interference processors would be worthwhile even though this would leave a fourth but weaker interference uncancelled.

The design of the interference canceller 11 allows for scalability and fault tolerance. One such embodiment is presented in FIG. 8 in which, two interference cancellers 11a and 11b are connected to the received signal path 42 of a receiver 14. In the illustrated configuration the interference canceller 11b is downstream with respect to interference canceller 11a or in cascade.

During normal operation, if there are fewer NBIs 16 present in a received DSSS signal 10 than pairs of interference processors 26 in interference canceller 11a, then interference canceller 11b remains operationally idle, continuously scanning for NBI. Sometimes interference canceller 11b finds interference that was too strong for canceller 11a to cancel. In that case, canceller 11b will provide further canceling.

If a situation arises in which during normal operation, there are more NBIs 16 present in the received DSSS signal 10 than pairs of interference processors 26 in interference canceller 11a, then interference canceller 11b is able to find and suppress the spillover NBIs 16. This illustrates the scalability of the interference cancellers 11.

If a situation arises in which there are NBIs 16 in a received DSSS signal 10 and interference canceller 11a fails, then interference canceller 11b processors automatically takes over by design. This illustrates the fault tolerance of the design. Special mention is given to the fact that in the case of a fault in interference canceller 11a no information need be sent to interference canceller 11b to take over.

In all embodiments, the embedded controller 80 has an interface means 118 including a communications port allowing it to be connected to an external personal computer. If a modem 120 is connected to the communications port of the interface 118, then remote access to the interference canceller 11 is possible. Not only can the interference canceller 11 be remotely programmed but monitored as well.

It will be appreciated that variant embodiments of the invention are possible.

One such variant would be the use of a channel analyzer to detect the presence or NBI and its center frequency. This would replace the sweep mode of the interference processors 26 of an interference canceller 11.

Yet another variant of the preferred embodiment would be the separation of functions inside interference canceller 11. By way of this example, interference processors 26 would only be interference canceller mode enabled and activated as presence of NBI is detected by dedicated processors whose sole function would be to sweep the wide bandwidth of the signal continuously. A method of deployment can be envisioned in which interference canceller mode enabled interference processors and NBI sweepers form part of separate systems interconnected by a communication protocol whereby the NBI sweepers need not necessarily be installed at the receiver site.

We claim:

1. An interference cancellation system that mitigates deleterious effects of one or more narrowband interference (NBI) signals against a wideband signal of interest in a received signal in a received signal path, the system comprising:

auxiliary sample means for extracting a copy of said received signal to obtain a wideband auxiliary signal;

feedback sample means for extracting from said received signal path a wideband error feedback signal downstream from the auxiliary sample means, and for processing said error feedback signal to isolate a narrowband feedback signal in response to a variable frequency control signal determining a central frequency of said narrowband feedback signal;

means for generating a narrowband reference signal from said auxiliary signal in response to a variable frequency control signal determining a central frequency of said narrowband reference signal, said narrowband reference signal containing one of said one or more NBI signals and having a strong correlation with respect to said narrowband feedback signal as a result of said NBI and not as a result of said signal of interest;

controller means for sweeping through at least a portion of a frequency range of the wideband signal of interest by setting said variable frequency control signal, for determining whether the wideband signal of interest is contaminated by NBI by examining said narrowband reference signal, and for generating in response to detection of NBI an NBI cancellation control signal;

means for correlating said narrowband reference signal and said narrowband feedback signal and for generating a complex correlation signal;

means providing an injection signal containing said one of said NBI signals;

complex weighting means for adjusting an amplitude and a phase of the injection signal in response to the correlation signal, and for generating, subject to said NBI cancellation control signal, an NBI cancellation signal; and means for injecting said NBI cancellation signal into said received signal path downstream of said auxiliary sample means and upstream of said feedback sample means, whereby the contaminating NBI is cancelled from the wideband signal of interest in the received signal path.

2. The system as claimed in claim 1, wherein said means for generating a narrowband reference signal comprise a channelization network suppressing signal strength and introducing a delay at frequencies away from said central frequency.

3. The system as claimed in claim 2, wherein said channelization network comprises a first filter receiving said auxiliary signal passing a bandwidth of said NBI, a second filter receiving said auxiliary signal passing a bandwidth wider than said NBI, and summing means for summing an output of said first and said second filters.

4. The systems as claimed in claim 2, wherein said channelization network further comprises a downconverter and an upconverter, wherein said channelization network suppresses signal strength and introduces said delay at IF and said reference signal is at RF.

5. The system as claimed in claim 4, further comprising a frequency synthesizer controlled by said variable frequency control signal, wherein said downconverter and said upconverter receive a local oscillator signal from said frequency synthesizer.

6. The system as claimed in claim 5, wherein said correlating means comprise a reference/feedback master/slave agc means for normalizing said reference signal and said feedback signal so as to maintain constant cancellation performance over a signal power dynamic range of said NBI.

7. The system as claimed in claim 6, wherein said complex weighting means comprise means to control a speed of response by at least one of filtering and amplifying said correlation signal.

8. The system as claimed in claim 1, comprising a plurality of interference processor units, wherein:
  a copy of said wideband auxiliary signal is provided to each of said interference processor unit by a signal replication means;
  a copy of said wideband error feedback signal is provided to each of said interference processor unit by another signal replication means;
  each of said interference processor units includes:
    feedback sample means for extracting from said received signal path a wideband error feedback signal downstream from the auxiliary sample means, and for processing said error feedback signal to isolate a narrowband feedback signal in response to a variable frequency control signal determining a central frequency of said narrowband feedback signal;
    means for generating a narrowband reference signal from said auxiliary signal in response to a variable frequency control signal determining a central frequency of said narrowband reference signal, said narrowband reference signal containing one of said one or more NBI signals and having a strong correlation with respect to said narrowband feedback signal as a result of said NBI and not as a result of said signal of interest;
    means for correlating said narrowband reference signal and said narrowband feedback signal and for generating a correlation signal;
    means providing an injection signal containing said one of said NBI signals; and
    complex weighting means for adjusting an amplitude and a phase of the injection signal in response to the correlation signal, and for generating, subject to said NBI cancellation control signal, an NBI cancellation signal;
  an NBI cancellation signal combiner is provided for combining each NBI cancellation signal from said processor units to form a combined NBI cancellation signal which is injected in said received signal path;
  a single narrowband interference signal is cancelled by each one of said signal processor units; and
  said controller means monitors a plurality of said narrowband reference signals, programs a plurality of said variable frequency control signals and generates an NBI cancellation control signal for each particular interference processor unit.

9. The system as claimed in claim 8, wherein said receive antenna comprises a first and a second receive antennae associated with a diversity system, said plurality of said interference processor units being substantially equally divided between said first and said second receive antennae, wherein a single narrowband interference signal in one of said antennae is cancelled by one of said plurality of said signal processor units.

10. The system as claimed in claim 9, wherein said controller means causes different parts of said portion of said frequency range of said wideband signal of interest to be swept at any one time over both of said antennae, and upon detection of NBI at a particular frequency, programs said variable frequency control signal and said NBI cancellation control signal corresponding to a pair of said interference processor units associated with both said antennae to cancel same said detected NBI.

11. The system as claimed in claim 1, wherein said wideband signal is a direct sequence spread spectrum (DSSS) signal.

12. A method of canceling NBI in a wideband signal comprising:
  extracting a reference signal and a feedback signal in a receiver signal path;
  scanning said reference signal for contaminating NBI to determine the central frequency of said contaminating NBI;
  isolating narrowband copies about said central frequency from said reference signal and said feedback signal, wherein said narrowband copy of said reference signal is strongly correlated with said narrowband copy of said feedback signal as a result of said NBI and not as a result of a signal of interest;
  correlating said narrowband copies;
  complex weighting an injection copy of the wideband reference signal using a result of the correlation; and
  injecting the weighted injection copy into said receiver signal path at a point between a point of extraction of said reference signal and of said feedback signal,
  whereby an equivalent of a notch filter is applied to the wideband signal of interest at the frequency of said contaminating NBI.

13. The method as claimed in claim 12, wherein said injection copy is a channelized copy of said extracted reference signal.

14. The method as claimed in claim 12, wherein said reference signal is subjected to a delay to decorrelate said signal of interest and leave said NBI substantially correlated prior to isolating said narrowband copy thereof.

15. The method as claimed in claim 14, wherein said reference signal is subjected to channelization to decorrelate said signal of interest and leave said NBI substantially correlated prior to isolating said narrowband copy thereof.

16. The method as claimed in claim 12, wherein said wideband signal is a direct sequence spread spectrum (DSSS) signal.

* * * * *